United States Patent
Liu

(10) Patent No.: US 10,405,241 B2
(45) Date of Patent: Sep. 3, 2019

(54) DATA TRANSMISSION METHOD AND SYSTEM, AND RELATED DEVICE

(71) Applicant: Huawei Technologies Co., Ltd., Shenzhen (CN)

(72) Inventor: Zhihui Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/413,978

(22) Filed: Jan. 24, 2017

(65) Prior Publication Data

US 2017/0134988 A1  May 11, 2017

Related U.S. Application Data

(63) Continuation of application No. PCT/CN2015/082889, filed on Jun. 30, 2015.

(30) Foreign Application Priority Data

Jul. 24, 2014  (CN) .......................... 2014 1 0357019

(51) Int. Cl.
*H04L 12/28* (2006.01)
*H04W 28/22* (2009.01)
(Continued)

(52) U.S. Cl.
CPC .......... *H04W 28/22* (2013.01); *H04L 1/0001* (2013.01); *H04L 1/0014* (2013.01); *H04M 3/568* (2013.01);
(Continued)

(58) Field of Classification Search
CPC ...................................................... H04L 12/50
(Continued)

(56) References Cited

U.S. PATENT DOCUMENTS

2002/0080951 A1* 6/2002 Tanrikulu .......... H04L 29/06027
379/350
2004/0071363 A1* 4/2004 Kouri ................. G06K 9/00516
382/276
(Continued)

FOREIGN PATENT DOCUMENTS

CN 101047408 A 10/2007
CN 101197585 A 6/2008
(Continued)

OTHER PUBLICATIONS

Machine Translation and Abstract of International Publication No. WO2012109932, Aug. 23, 2012, 23 pages.
(Continued)

*Primary Examiner* — Dang T Ton
(74) *Attorney, Agent, or Firm* — Conley Rose, P.C.

(57) ABSTRACT

A data transmission method, where a host acquires parameter information of a wireless communication channel between a wireless microphone array and the host, that is, a signal-to-noise ratio or bandwidth. The host reduces sampling frequency of the wireless microphone array or decreases a quantity of data transmission paths between the wireless microphone array and the host when the acquired parameter information satisfies a first preset condition such that bandwidth occupied when the wireless microphone array transmits data is reduced.

19 Claims, 6 Drawing Sheets

(51) Int. Cl.
*H04W 28/18* (2009.01)
*H04L 1/00* (2006.01)
*H04R 3/00* (2006.01)
*H04M 3/56* (2006.01)
*H04W 24/08* (2009.01)

(52) U.S. Cl.
CPC ............ *H04R 3/005* (2013.01); *H04W 24/08* (2013.01); *H04W 28/18* (2013.01); *H04M 2203/509* (2013.01); *H04R 2201/403* (2013.01); *H04R 2420/07* (2013.01); *H04R 2430/25* (2013.01)

(58) Field of Classification Search
USPC ........................................................ 370/329
See application file for complete search history.

(56) References Cited

U.S. PATENT DOCUMENTS

| | | | |
|---|---|---|---|
| 2012/0177217 | A1 | 7/2012 | Schmidt et al. |
| 2013/0051577 | A1 | 2/2013 | Morcelli et al. |

FOREIGN PATENT DOCUMENTS

| | | | |
|---|---|---|---|
| CN | 102256098 | A | 11/2011 |
| CN | 102405651 | A | 4/2012 |
| CN | 102457298 | A | 5/2012 |
| CN | 102457714 | A | 5/2012 |
| CN | 102934160 | A | 2/2013 |
| CN | 103916367 | A | 7/2014 |
| CN | 103986996 | A | 8/2014 |
| CN | 104093174 | A | 10/2014 |
| CN | 203859872 | U | 10/2014 |
| WO | 2007052269 | A2 | 5/2007 |
| WO | 2012109932 | A1 | 8/2012 |

OTHER PUBLICATIONS

Foreign Communication From a Counterpart Application, Chinese Application No. 201410357019.1, Chinese Office Action dated Sep. 4, 2017, 9 pages.
Machine Translation and Abstract of Chinese Publication No. CN102457714, May 16, 2012, 11 pages.
Machine Translation and Abstract of Chinese Publication No. CN103916367, Jul. 9, 2014, 13 pages.
Machine Translation and Abstract of Chinese Publication No. CN103986996, Aug. 13, 2014, 11 pages.
Machine Translation and Abstract of Chinese Publication No. CN104093174, Oct. 8, 2014, 27 pages.
Machine Translation and Abstract of Chinese Publication No. CN203859872, Oct. 1, 2014, 8 pages.
"Study on Optimum Design of Array about Microphone Array Sound Source Localization Systems," Part 1, Mar. 2014, 34 pages.
"Study on Optimum Design of Array about Microphone Array Sound Source Localization Systems," Part 2, Mar. 2014, 34 pages.
Foreign Communication From a Counterpart Application, European Application No. 15824723.9, Extended European Search Report dated Jun. 16, 2017, 8 pages.
Foreign Communication From a Counterpart Application, Chinese Application No. 201410357019.1, Chinese Office Action dated Feb. 6, 2017, 7 pages.
Foreign Communication From a Counterpart Application, PCT Application No. PCT/CN2015/082889, English Translation of International Search Report dated Sep. 25, 2015, 3 pages.
Foreign Communication From a Counterpart Application, PCT Application No. PCT/CN2015/082889, English Translation of Written Opinion dated Sep. 25, 2015, 7 pages.

\* cited by examiner

DATA TRANSMISSION METHOD AND SYSTEM, AND RELATED DEVICE

CROSS-REFERENCE TO RELATED APPLICATIONS

This application is a continuation of International Patent Application No. PCT/CN2015/082889 filed on Jun. 30, 2015, which claims priority to Chinese Patent Application No. 201410357019.1 filed on Jul. 24, 2014. The disclosures of the aforementioned applications are hereby incorporated by reference in their entireties.

TECHNICAL FIELD

The present disclosure relates to the field of communications technologies, and in particular, to a data transmission method and system, and a related device.

BACKGROUND

Using a wireless microphone to pick up sounds in a conference has prominent advantages in mobility and simplicity. Generally, multiple wireless microphones need to be deployed in a conference, in order to ensure a good sound pickup effect.

Currently, main forms of wireless microphones include frequency modulation (FM), BLUETOOTH, Digital Enhanced Cordless Telecommunications (DECT), WiFi wireless communication, and so on. WiFi wireless communication features a long transmission distance, provides large bandwidth, supports multiple access points, and has found many applications. However, if a WiFi radio channel is interfered or blocked or signals have poor directionality, sufficient bandwidth is not always provided, resulting in a packet loss and a lowered sound pickup effect. Therefore, a packet loss concealment policy is needed. For example, a 48 kilohertz (kHz) 16-bit sampling signal needs a bandwidth of 768 kilobits per second (kbps). If there are three wireless microphones, a bandwidth of 2.3 megabits per second (Mbps) is needed. A larger quantity of microphones indicates that a larger bandwidth is needed.

Therefore, bandwidth requirements of multiple wireless microphones cannot be met when a wireless microphone is in the form of WiFi wireless communication, if there is interference or blocking.

SUMMARY

Embodiments of the present disclosure provide a data transmission method and system, and a related device, which implement dynamic adjustment of a data transmission parameter of a wireless microphone array according to an actual status of communication between the wireless microphone array and a host.

A first aspect of the embodiments of the present disclosure provides a data transmission method, including acquiring parameter information of wireless communication channels between a wireless microphone array and a host, and determining reduction information of sampling frequency of the wireless microphone array if the parameter information satisfies a first preset condition, and sending a control command to the wireless microphone array, where the control command includes the reduction information of the sampling frequency, or determining decrease information of a quantity of data transmission paths between the wireless microphone array and the host, and sending a control command to the wireless microphone array, where the control command includes the decrease information of the quantity of data transmission paths.

In a first possible implementation manner of the first aspect of the embodiments of the present disclosure, the method further includes determining increase information of the sampling frequency of the wireless microphone array if the parameter information satisfies a second preset condition, and sending a control command to the wireless microphone array, where the control command includes the increase information of the sampling frequency, or determining increase information of the quantity of data transmission paths between the wireless microphone array and the host, and sending a control command to the wireless microphone array, where the control command includes the increase information of the quantity of data transmission paths.

With reference to the first possible implementation manner of the first aspect of the embodiments of the present disclosure, in a second possible implementation manner of the first aspect of the embodiments of the present disclosure, the parameter information includes a signal-to-noise ratio and/or bandwidth. The first preset condition further includes the signal-to-noise ratio of the wireless communication channels is less than a first signal-to-noise ratio threshold, or the bandwidth of the wireless communication channels is less than a first bandwidth threshold, and the second preset condition includes the signal-to-noise ratio of the wireless communication channels is greater than a second signal-to-noise ratio threshold, or the bandwidth of the wireless communication channels is greater than a second bandwidth threshold, where the second signal-to-noise ratio threshold is greater than or equal to the first signal-to-noise ratio threshold, and the second bandwidth threshold is greater than or equal to the first bandwidth threshold.

With reference to the first aspect of the embodiments of the present disclosure, or either implementation manner of the first and the second possible implementation manners of the first aspect, in a third possible implementation manner of the first aspect of the embodiments of the present disclosure, after determining reduction information of sampling frequency of the wireless microphone array, the method further includes determining the decrease information of the quantity of data transmission paths between the wireless microphone array and the host if reduced sampling frequency is less than or equal to preset minimum frequency, where the control command sent to the wireless microphone array includes the reduction information of the sampling frequency, and further includes the decrease information of the quantity of data transmission paths.

With reference to the first aspect of the embodiments of the present disclosure, or either implementation manner of the first and the second possible implementation manners of the first aspect, in a fourth possible implementation manner of the first aspect of the embodiments of the present disclosure, determining decrease information of a quantity of data transmission paths between the wireless microphone array and the host further includes determining, according to a preset correspondence between parameter information and a quantity of data transmission paths, a quantity of data transmission paths that corresponds to the acquired parameter information, and setting the quantity of the wireless microphone arrays as a quantity of data transmission paths that are available between the wireless microphone arrays and the host after the decrease if the determined quantity of data transmission paths is less than a quantity of the wireless microphone arrays, and after setting the quantity of the wireless microphone arrays as a decreased quantity of data transmission paths between the wireless microphone array and the host, the method further includes determining reduction information of sampling frequency of a wireless microphone array in a data transmission path that is available after the decrease, where the control command sent to the wireless microphone array includes the decrease information of the quantity of data transmission paths, and further includes the reduction information of the sampling frequency of the wireless microphone array in the data transmission path that is available after the decrease.

With reference to the first aspect of the embodiments of the present disclosure, or either implementation manner of the first and the second possible implementation manners of the first aspect, in a fifth possible implementation manner of the first aspect of the embodiments of the present disclosure, before acquiring parameter information of wireless communication channels between a wireless microphone array and a host, the method further includes detecting an activation status of the wireless microphone array, and for a wireless microphone array in an active state, performing steps of acquiring the parameter information, determining the reduction information of the sampling frequency, and sending the control command, or performing steps of acquiring the parameter information, determining the decrease information of the quantity of data transmission paths, and sending the control command.

With reference to the first aspect of the embodiments of the present disclosure, or either implementation manner of the first and the second possible implementation manners of the first aspect, in a sixth possible implementation manner of the first aspect of the embodiments of the present disclosure, before acquiring parameter information of wireless communication channels between a wireless microphone array and a host, the method further includes receiving data that is transmitted in at least one data transmission path by the wireless microphone array, where the data that is transmitted in the data transmission path includes data sampled from collected data by the wireless microphone array, and envelope data of the data collected by the wireless microphone array, and if the decrease information in the control command sent to the wireless microphone array includes indication information, where the indication information is used to instruct to delete a first data transmission path of the wireless microphone array, the method further includes receiving first envelope data transmitted in the first data transmission path by the wireless microphone array, where the first envelope data is envelope data of data that is collected in the first data transmission path of the wireless microphone array by a microphone.

A second aspect of the embodiments of the present disclosure provides a data transmission method, including receiving, by a wireless microphone array, a control command sent by a host, sampling, by the wireless microphone array, collected data at reduced sampling frequency according to the reduction information if the control command includes reduction information of sampling frequency of the wireless microphone array, and transmitting, by the wireless microphone array, in a data transmission path that is available after decrease, data to the host according to the decrease information if the control command includes decrease information of a quantity of data transmission paths between the wireless microphone array and the host.

In a first possible implementation manner of the second aspect of the embodiments of the present disclosure, before receiving, by a wireless microphone array, a control command sent by a host, the method further includes transmitting, by the wireless microphone array, in at least one data transmission path, data to the host, where the data that is transmitted in the data transmission path includes data sampled from the collected data by the wireless microphone array, and envelope data of the data collected by the wireless microphone array, and if the decrease information in the control command received by the wireless microphone array includes indication information, where the indication information is used to instruct to delete a first data transmission path of the wireless microphone array, the method further includes transmitting, by the wireless microphone array, in the first data transmission path, first envelope data to the host, where the first envelope data is envelope data of data that is collected in the first data transmission path of the wireless microphone array by a microphone.

With reference to the first possible implementation manner of the second aspect of the embodiments of the present disclosure, in a second possible implementation manner of the second aspect of the embodiments of the present disclosure, before transmitting, by the wireless microphone array, in the first data transmission path, first envelope data to the host, the method further includes transmitting, by the wireless microphone array, in the first data transmission path, at least one packet of the data sampled from the collected data by the wireless microphone array, and the first envelope data to the host, and then stopping transmitting, in the first data transmission path, the data sampled from the collected data by the wireless microphone array.

With reference to the second aspect of the embodiments of the present disclosure, or either implementation manner of the first and the second possible implementation manners of the second aspect, in a third possible implementation manner of the second aspect of the embodiments of the present disclosure, the method further includes sampling, by the wireless microphone array, the collected data at increased sampling frequency according to the increase information of the sampling frequency if the control command includes increase information of the sampling frequency of the wireless microphone array, and transmitting, by the wireless microphone array, in a data transmission path that is available after increase, data to the host according to the increase information of the quantity of data transmission paths if the control command includes increase information of the quantity of data transmission paths between the wireless microphone array and the host.

A third aspect of the embodiments of the present disclosure provides a host, including a parameter acquiring unit configured to acquire parameter information of wireless communication channels between a wireless microphone array and the host, a first processing unit configured to determine reduction information of sampling frequency of the wireless microphone array, or determine decrease information of a quantity of data transmission paths between the wireless microphone array and the host if the parameter information acquired by the parameter acquiring unit satisfies a first preset condition, and a command sending unit configured to send a control command to the wireless microphone array if the first processing unit determines the reduction information of the sampling frequency, where the control command includes the reduction information of the sampling frequency, or send a control command to the wireless microphone array if the first processing unit determines the decrease information of the quantity of data transmission paths, where the control command includes the decrease information of the quantity of data transmission paths.

In a first possible implementation manner of the third aspect of the embodiments of the present disclosure, the host further includes a second processing unit configured to determine increase information of the sampling frequency of the wireless microphone array, or determine increase information of the quantity of data transmission paths between the wireless microphone array and the host if the parameter information acquired by the parameter acquiring unit satisfies a second preset condition, where the command sending unit is further configured to send a control command to the wireless microphone array if the second processing unit determines the increase information of the sampling frequency, where the control command includes the increase information of the sampling frequency, or send a control command to the wireless microphone array if the second processing unit determines the increase information of the quantity of data transmission paths, where the control command includes the increase information of the quantity of data transmission paths.

With reference to the first possible implementation manner of the third aspect of the embodiments of the present disclosure, in a second possible implementation manner of the third aspect of the embodiments of the present disclosure, the parameter information includes a signal-to-noise ratio and/or bandwidth. The first preset condition includes the signal-to-noise ratio of the wireless communication channel is less than a first signal-to-noise ratio threshold, or the bandwidth of the wireless communication channel is less than a first bandwidth threshold, and the second preset condition includes the signal-to-noise ratio of the wireless communication channel is greater than a second signal-to-noise ratio threshold, or the bandwidth of the wireless communication channels is greater than a second bandwidth threshold, where the second signal-to-noise ratio threshold is greater than or equal to the first signal-to-noise ratio threshold, and the second bandwidth threshold is greater than or equal to the first bandwidth threshold.

With reference to the third aspect of the embodiments of the present disclosure, or either implementation manner of the first and the second possible implementation manners of the third aspect, in a third possible implementation manner of the third aspect of the embodiments of the present disclosure, the first processing unit is further configured to determine the reduction information of the sampling frequency of the wireless microphone array if the parameter information satisfies the first preset condition. The first processing unit is further configured to determine the decrease information of the quantity of data transmission paths between the wireless microphone array and the host if reduced sampling frequency is less than or equal to preset minimum frequency, and the command sending unit is configured to send a control command to the wireless microphone array, where the control command includes the reduction information of the sampling frequency, and further includes the decrease information of the quantity of data transmission paths.

With reference to the third aspect of the embodiments of the present disclosure, or either implementation manner of the first and the second possible implementation manners of the third aspect, in a fourth possible implementation manner of the third aspect of the embodiments of the present disclosure, the first processing unit further includes a path determining unit configured to determine, according to a preset correspondence between parameter information and a quantity of data transmission paths, a quantity of data transmission paths that corresponds to the parameter information acquired by the parameter acquiring unit, a decrease determining unit configured to set the quantity of the wireless microphone arrays as a quantity of data transmission paths that are available between the wireless microphone arrays and the host after the decrease if the quantity of data transmission paths that is determined by the path determining unit is less than a quantity of the wireless microphone arrays, and a sampling determining unit configured to determine reduction information of sampling frequency of a wireless microphone array in a data transmission path that is available after the decrease, and the command sending unit is configured to send a control command to the wireless microphone array, where the control command includes the decrease information of the quantity of data transmission paths, and further includes the reduction information of the sampling frequency of the wireless microphone array in the data transmission path that is available after the decrease.

With reference to the third aspect of the embodiments of the present disclosure, or either implementation manner of the first and the second possible implementation manners of the third aspect, in a fifth possible implementation manner of the third aspect of the embodiments of the present disclosure, the host further includes a status detection unit configured to detect an activation status of the wireless microphone array, and instruct the parameter acquiring unit to perform, for a wireless microphone array in an active state, the step of acquiring the parameter information.

With reference to the third aspect of the embodiments of the present disclosure, or either implementation manner of the first and the second possible implementation manners of the third aspect, in a sixth possible implementation manner of the third aspect of the embodiments of the present disclosure, the host further includes a data receiving unit configured to receive data that is transmitted in at least one data transmission path by the wireless microphone array, where the data that is transmitted in the data transmission path includes data sampled from collected data by the wireless microphone array, and envelope data of the data collected by the wireless microphone array, and if the decrease information in the control command sent by the command sending unit to the wireless microphone array includes indication information, where the indication information is used to instruct to delete a first data transmission path of the wireless microphone array, the data receiving unit is configured to receive first envelope data that is transmitted in the first data transmission path by the wireless microphone array, where the first envelope data is envelope data of data that is collected in the first data transmission path of the wireless microphone array by a microphone.

A fourth aspect of the embodiments of the present disclosure provides a wireless microphone array, including a command receiving unit configured to receive a control command sent by a host, a sampling unit configured to sample, by the wireless microphone array, collected data at reduced sampling frequency according to the reduction information if the control command received by the command receiving unit includes reduction information of sampling frequency of the wireless microphone array, and a data transmission unit configured to transmit, by the wireless microphone array, in a data transmission path that is available after decrease, data to the host according to the decrease information if the control command received by the command receiving unit includes decrease information of a quantity of data transmission paths between the wireless microphone array and the host.

In a first possible implementation manner of the fourth aspect of the embodiments of the present disclosure the data transmission unit is further configured to transmit, in at least one data transmission path, data to the host, where the data that is transmitted in the data transmission path includes data sampled from the collected data by the wireless microphone array, and envelope data of the data collected by the wireless microphone array, and if the decrease information in the control command received by the command receiving unit includes indication information, where the indication information is used to instruct to delete a first data transmission path of the wireless microphone array, the data transmission unit is further configured to transmit, in the first data transmission path, first envelope data to the host, where the first envelope data is envelope data of data that is collected in the first data transmission path of the wireless microphone array by a microphone.

With reference to the first possible implementation manner of the fourth aspect of the embodiments of the present disclosure, in a second possible implementation manner of the fourth aspect of the embodiments of the present disclosure, before transmitting, in the first data transmission path, the first envelope data to the host, the data transmission unit is further configured to transmit, in the first data transmission path, at least one packet of the data sampled from the collected data, and the first envelope data, and then stop transmitting, in the first data transmission path, the data sampled from the collected data.

With reference to the fourth aspect of the embodiments of the present disclosure, or either implementation manner of the first and the second possible implementation manners of the fourth aspect, in a third possible implementation manner of the fourth aspect of the embodiments of the present disclosure the sampling unit is configured to sample the collected data at increased sampling frequency according to the increase information of the sampling frequency if the control command received by the command receiving unit includes increase information of the sampling frequency of the wireless microphone array, and the data transmission unit is configured to transmit, in a data transmission path that is available after increase, data to the host according to the increase information of the quantity of data transmission paths if the control command received by the command receiving unit includes increase information of the quantity of data transmission paths between the wireless microphone array and the host.

A fifth aspect of the embodiments of the present disclosure provides a data transmission system, including a host and multiple wireless microphone arrays, where the host is the host according to the third aspect of the embodiments of the present disclosure or any possible implementation manner of the first to the sixth possible implementation manners of the third aspect, and the wireless microphone array is the wireless microphone array according to the fourth aspect of the embodiments of the present disclosure or any possible implementation manner of the first to the third possible implementation manners of the fourth aspect.

In the data transmission method of the embodiments, a host acquires parameter information of wireless communication channels between a wireless microphone array and the host. The host reduces sampling frequency of the wireless microphone array or decreases a quantity of data transmission paths between the wireless microphone array and the host such that bandwidth occupied when the wireless microphone array transmits data is reduced if the acquired parameter information satisfies a first preset condition. In this way, the host can dynamically adjust a data transmission parameter of the wireless microphone array according to an actual status of communication between the wireless microphone array and the host, which satisfies a demand of the wireless microphone array that communicates with the host as much as possible.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
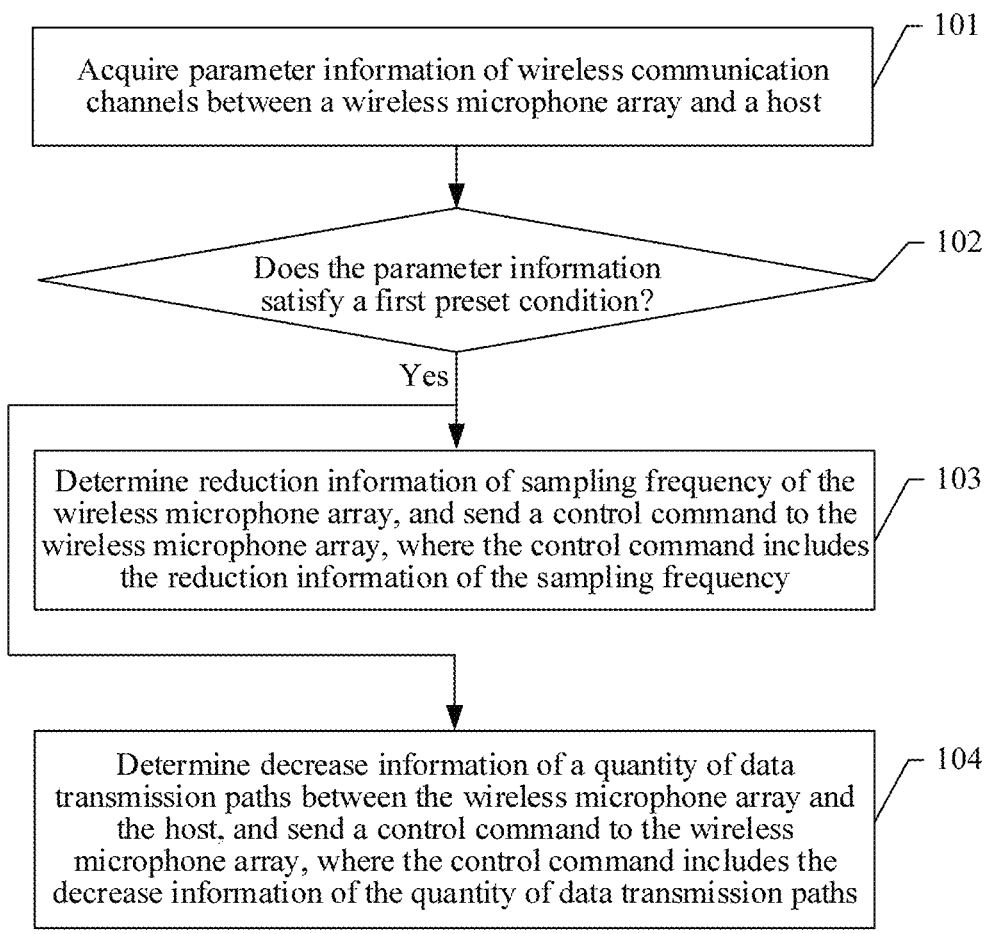
FIG. 1 is a flowchart of a data transmission method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in orders except the order illustrated or described herein. Moreover, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of the present disclosure provides a data transmission method, which is mainly applied to a communications system including a host and multiple wireless microphone arrays, where at least one microphone is set in each wireless microphone array. Data such as voice data is collected using the microphone. Then, after performing modulus sampling on the data collected by each microphone, the wireless microphone array directly transmits the data to the host, and the wireless microphone array also transmits envelope data of the collected data to the host, where the envelope data may indicate energy of the collected data. Then, the host performs audio mixing and switching, where the audio mixing and switching step may include performing echo cancellation on the data received by the host and then obtaining, through comparison, a maximum volume to the power of N from the data, where N is greater than or equal to 1, and the comparison is performed according to the received envelope data, encodes the data after audio mixing, and sends the encoded data to a remote end.

In the foregoing embodiment, sampling frequency of a wireless microphone array refers to frequency at which the wireless microphone array performs modulus sampling on data collected by each microphone. In addition, because at least one microphone is set in one wireless microphone array, at least one data transmission path may be formed between the wireless microphone array and a host. One data transmission path between the wireless microphone array and the host refers to a path for transmitting data between one microphone in the wireless microphone array and the host, and data sampled from the data collected by one microphone is transmitted in one data transmission path.

The method in this embodiment of the present disclosure is a data transmission method executed by the host. FIG. 1 is a flowchart of the method. The method includes the following steps.

Step 101: Acquire parameter information of wireless communication channels between a wireless microphone array and a host, where the parameter information includes a signal-to-noise ratio and/or bandwidth.

It may be understood that, in a process of transmitting data between each wireless microphone array and the host, the host acquires overall parameter information of wireless communication channels between these wireless microphones and the host. For example, the host acquires total bandwidth that is occupied by these wireless microphones when these wireless microphones transmit data. In a specific implementation, the host may actively detect the wireless communication channels, to obtain the parameter information, or each wireless microphones may actively send parameter information of the corresponding wireless communication channel to the host, and then the host consolidates the parameter information.

Step 102: Determine whether the parameter information acquired in step 101 satisfies a first preset condition, and perform step 103 or step 104 if the parameter information satisfies the first preset condition, or the process ends if the parameter information does not satisfy the first preset condition.

Herein, the first preset condition may include the signal-to-noise ratio of the wireless communication channels is less than a first signal-to-noise ratio threshold, or the bandwidth of the wireless communication channels is less than a first bandwidth threshold, and the first bandwidth threshold may be changed according to processing in the subsequent step 103 or 104. For example, when sampling frequency of the wireless microphone array is reduced, or a quantity of data transmission paths is decreased, the first bandwidth threshold may be reduced, and so on.

Step 103: Determine reduction information of sampling frequency of the wireless microphone array, and send a control command to the wireless microphone array, where the control command includes the reduction information of the sampling frequency. In this way, the wireless microphone array samples collected data according to reduced sampling frequency.

Herein, sampling frequency of some or all of the wireless microphone arrays may be reduced. If the sampling frequency is reduced, an amount of data transmitted by a wireless microphone array to the host decreases, and therefore occupied bandwidth also decreases. The reduction information of the sampling frequency included in the control command may be information such as the reduced sampling frequency, or a reduced amount of the sampling frequency. In addition, the host may send the control command to only a wireless microphone array whose sampling frequency is reduced, and does not need to send the control command to all the wireless microphone arrays. The reduced amount of the sampling frequency may be set according to a preset rule, and is, for example, half, ⅓, or ¼ of the sampling frequency.

Step 104: Determine decrease information of a quantity of data transmission paths between the wireless microphone array and the host, and send a control command to the wireless microphone array, where the control command includes the decrease information of the quantity of data transmission paths. In this way, data is not transmitted on some data transmission paths between the wireless microphone array and the host, that is, the wireless microphone array does not send data collected by microphones in these data transmission paths to the host.

Herein, the decrease information of the quantity of data transmission paths that is included in the control command may be information such as a quantity of data transmission paths that are available after the decrease, or an amount of decrease in the quantity of data transmission paths, and may further include information such as that data is not transmitted in data transmission paths between which microphones in which wireless microphone arrays and the host. In addition, the host may send the control command to only wireless microphone arrays corresponding to data transmission paths in which data is not transmitted, and does not need to send the control command to all the wireless microphone arrays.

The amount of decrease in the quantity of data transmission paths may be set according to a preset rule, and is, for example, half of a current quantity of data transmission paths. In addition, the host may determine, according to a status of data transmission between each wireless microphone array and the host, data transmission paths to be controlled to not transmit data.

Further, in a specific embodiment, the host may further determine whether the acquired parameter information satisfies a second preset condition if the host determines that the acquired parameter information does not satisfy the first preset condition in step 102. The host determines increase information of the sampling frequency of the wireless microphone array, and sends a control command to the wireless microphone array if the acquired parameter information satisfies the second preset condition, where the control command includes the increase information of the sampling frequency such that the wireless microphone array samples the collected data according to increased sampling frequency, or determines increase information of the quantity of data transmission paths between the wireless microphone array and the host, and sends a control command to the wireless microphone array, where the control command includes the increase information of the quantity of data transmission paths.

The second preset condition further includes the signal-to-noise ratio of the wireless communication channels is greater than a second signal-to-noise ratio threshold, or the bandwidth of the wireless communication channels is greater than a second bandwidth threshold. Herein, the second signal-to-noise ratio threshold is greater than the first signal-to-noise ratio threshold, and the second bandwidth threshold is greater than the first bandwidth threshold. In addition, the second bandwidth threshold may be changed with the increase of the sampling frequency of the wireless microphone array or the increase of the quantity of data transmission paths. For example, the second bandwidth threshold may be increased.

It should be noted that, the foregoing steps 101 to 104 are a process in which the host dynamically adjusts a data transmission parameter of the wireless microphone array, and the host may periodically or randomly perform steps 101 to 104 cyclically.

It can be seen that, in the data transmission method of this embodiment, a host acquires parameter information of wireless communication channels between a wireless microphone array and the host. The host reduces sampling frequency of the wireless microphone array or decreases a quantity of data transmission paths between the wireless microphone array and the host such that bandwidth occupied when the wireless microphone array transmits data is reduced if the acquired parameter information satisfies a first preset condition. In this way, the host can dynamically adjust a data transmission parameter of the wireless microphone array according to an actual status of communication between the wireless microphone array and the host, which satisfies a demand of the wireless microphone array that communicates with the host as much as possible.

Figure 2:
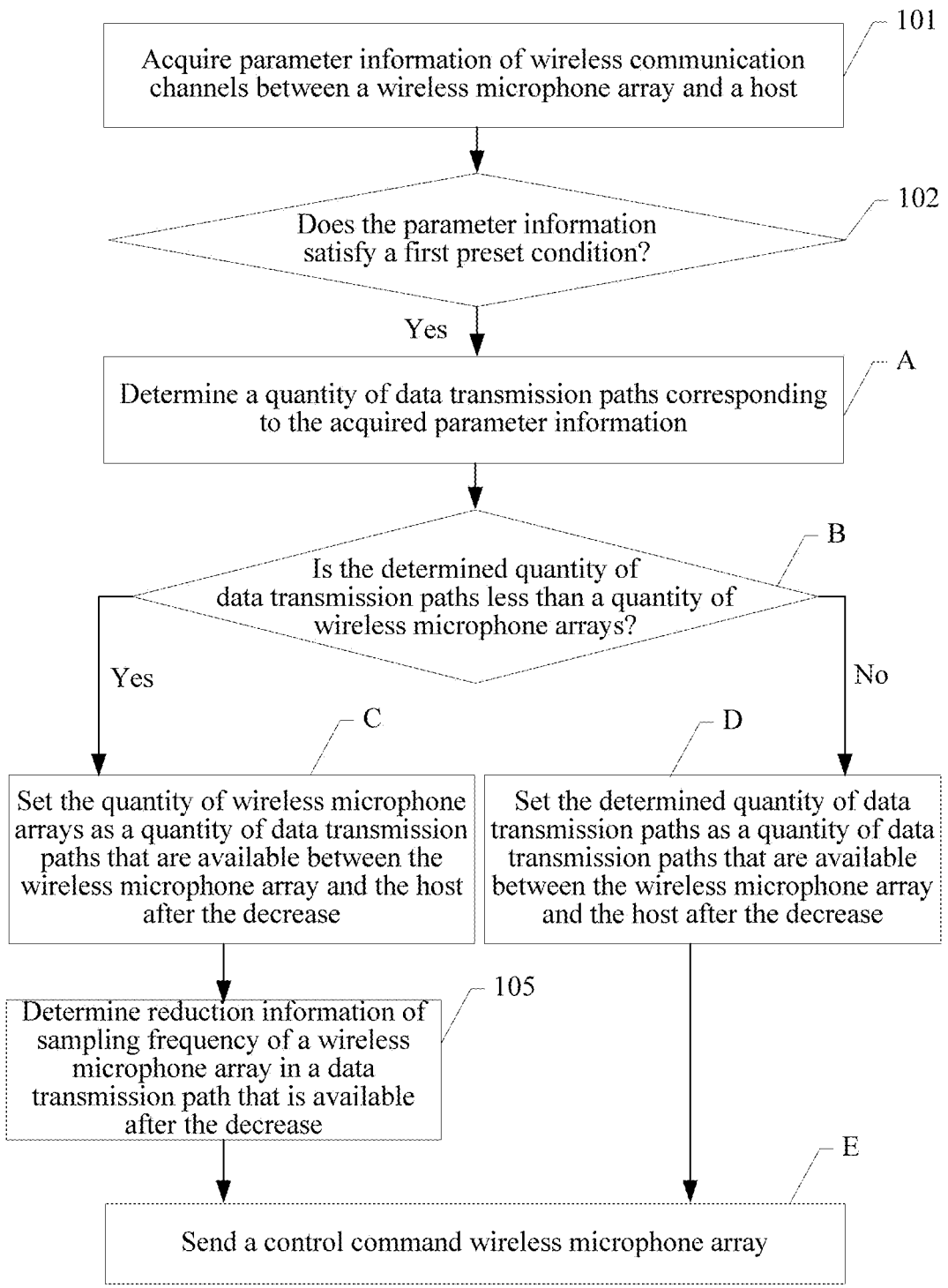
FIG. 2 is a flowchart of another data transmission method according to an embodiment of the present disclosure.

Referring to FIG. 2, in a specific embodiment, when the acquired parameter information satisfies the first preset condition in step 102, the host may further perform step 104 by performing the following steps.

Step A: Determine a quantity of data transmission paths corresponding to the acquired parameter information, where the quantity of data transmission paths determined according to a preset correspondence between the parameter information and the quantity of data transmission paths.

The preset correspondence between the parameter information and the quantity of data transmission paths is preset in the host by a user according to an actual empirical value, and the quantity of data transmission paths in the correspondence is an optimal quantity of data transmission paths that can satisfy, under a condition of the parameter information (which includes a signal-to-noise ratio and/or bandwidth) in the correspondence, a demand of a wireless microphone array that transmits data.

Step B: Determine whether the quantity of data transmission paths determined is less than a quantity of wireless microphone arrays, and perform step C if the quantity of data transmission paths is less than the quantity of wireless microphone arrays, or perform step D if the quantity of data transmission paths is greater than or equal to the quantity of wireless microphone arrays, and then perform step E.

Step C: Set the quantity of wireless microphone arrays as a quantity of data transmission paths that are available between the wireless microphone arrays and the host after the decrease.

In order to ensure an effect of audio mixing and switching performed subsequently by the host, and it needs to be set that each wireless microphone array needs to transmit data using at least one data transmission path. Therefore, in this case, on the basis of decreasing the quantity of data transmission paths, the host needs to further perform step 105, that is, determining reduction information of sampling frequency of a wireless microphone array in a data transmission path that is available after the decrease, where reduction information of sampling frequency of some or all of the wireless microphone arrays in the data transmission paths that are available after the decrease may be determined, and then perform step E. When step E is performed, the control command sent by the wireless microphone array includes decrease information of the quantity of data transmission paths, and further includes the reduction information, which is determined in step 105, of the sampling frequency of the wireless microphone array in the data transmission path that is available after the decrease.

Step D: Set the determined quantity of data transmission paths as a quantity of data transmission paths that are available between the wireless microphone arrays and the host after the decrease.

Step E: Send a control command to the wireless microphone array, where the control command includes the decrease information of the quantity of data transmission paths.

In this way, in this embodiment, by performing steps A to E, the host can dynamically decrease the quantity of data transmission paths between the wireless microphone arrays and the host when the acquired parameter information satisfies the first preset condition.

Figure 3:
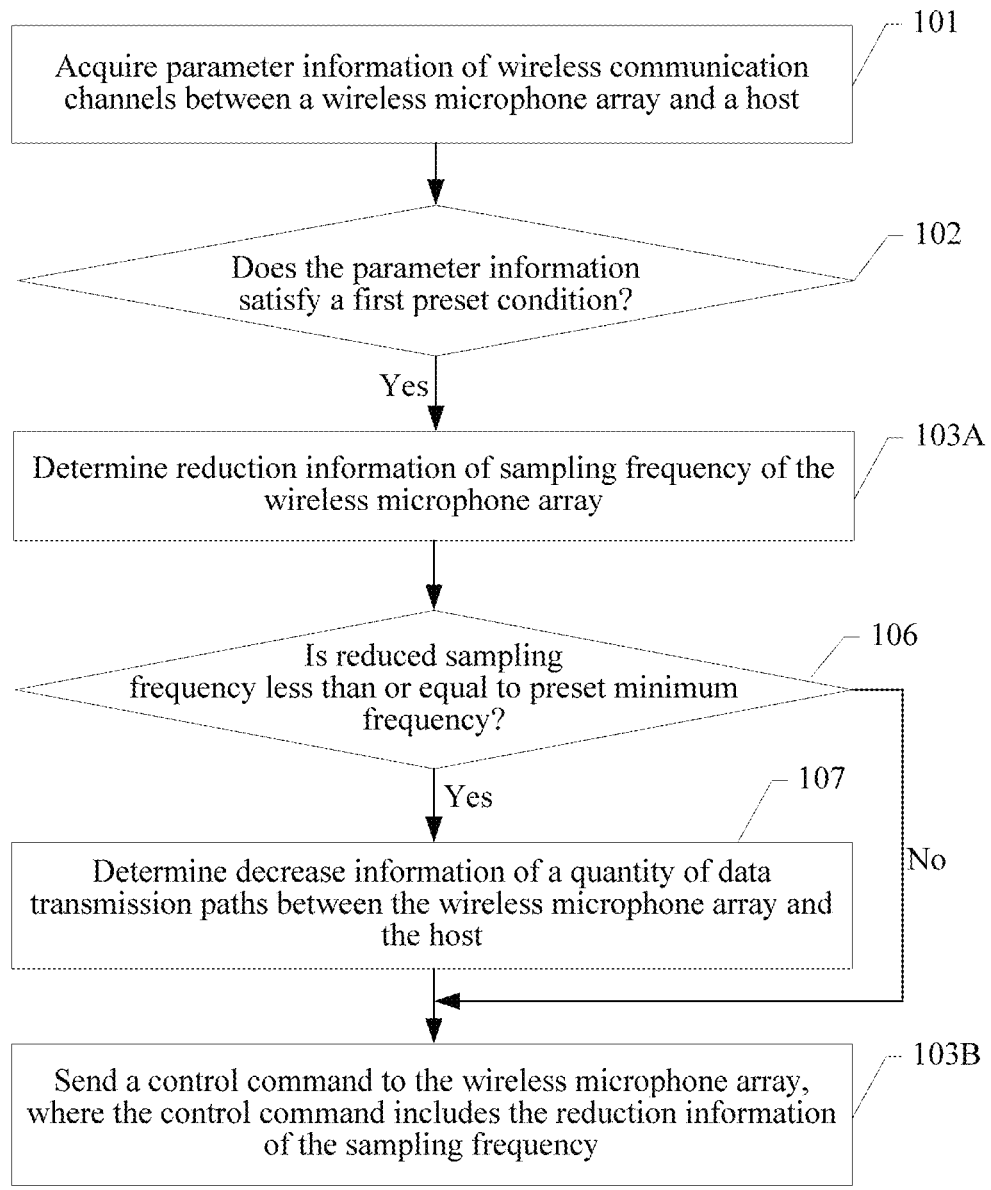
FIG. 3 is a flowchart of another data transmission method according to an embodiment of the present disclosure.

Referring to FIG. 3, in another specific embodiment, when the acquired parameter information satisfies the first preset condition in step 102, the host may first perform sub-step 103A of step 103, that is, determining the reduction information of the sampling frequency of the wireless microphone array, and then the host performs the following steps 106 and 107, and finally performs another sub-step 103B of step 103.

Step 106: Determine whether the reduced sampling frequency is less than or equal to preset minimum frequency, and the host may further perform step 107 if the reduced sampling frequency is less than or equal to the preset minimum frequency, or perform sub-step 103B if the reduced sampling frequency is greater than the preset minimum frequency, that is, sending a control command to the wireless microphone array, where the control command includes the reduction information of the sampling frequency, and then the process ends.

Step 107 Determine the decrease information of the quantity of data transmission paths between the wireless microphone array and the host, where determining is on the basis of reducing the sampling frequency of the wireless microphone array, and then perform sub-step 103B, that is, sending a control command to the wireless microphone array. In this case, the control command not only needs to include the reduction information of the sampling frequency, but also needs to include the decrease information of the quantity of data transmission paths that is determined in step 107.

It may be understood that, in this embodiment, when determining that the reduced sampling frequency is less than or equal to the preset minimum frequency, the host directly decreases the quantity of data transmission paths. Alternatively, in another specific embodiment, when the host acquires parameter information of wireless communication channels between the wireless microphone array and the host next time, the host decreases the quantity of data transmission paths only if the parameter information acquired next time satisfies a third preset condition. Further, after the host performs step 103, if the parameter information acquired next time by the host satisfies the third preset condition, the host performs the foregoing steps 106 and 107, and then sends, to the wireless microphone array, a control command that carries the decrease information of the quantity of data transmission paths.

The third preset condition further includes the signal-to-noise ratio of the wireless communication channels is less than a third signal-to-noise ratio threshold, or the bandwidth of the wireless communication channels is less than a third bandwidth threshold, where the third signal-to-noise ratio threshold is less than the first signal-to-noise ratio threshold, and the third bandwidth threshold is less than the first bandwidth threshold.

Therefore, in this embodiment, by performing steps 101 to 103 and steps 106 and 107, the host can decrease the quantity of data transmission paths between the wireless microphone array and the host on the basis of dynamically reducing the sampling frequency of the wireless microphone array.

It should be noted that, the foregoing steps 101 to 104 are a method used by a host to control data transmission of a wireless microphone array in a process of data transmission between the wireless microphone array and the host. To enable the host to better obtain an actual status of the wireless microphone array and control data transmitted by the wireless microphone array, in a specific embodiment, the data transmitted between the wireless microphone array and the host not only needs to include data sampled from collected data by the wireless microphone array, but also needs to include envelope data of the data collected by the wireless microphone array. Further, before step 101, the host may receive data that is transmitted in at least one data transmission path by the wireless microphone array, where the data transmitted in the data transmission path includes the data sampled from the collected data by the wireless microphone array, and the envelope data of the data collected by the wireless microphone array. In this way, the host obtains, through comparison, a maximum volume to the power of N according to envelope data transmitted in each data transmission path, performs audio mixing and encoding, and sends encoded data to a remote end.

When step 104 is performed, if the decrease information in the control command sent by the host to the wireless microphone array includes indication information, where the indication information is used to instruct to delete a first data transmission path of the wireless microphone array, the host subsequently receives only first envelope data transmitted in the first data transmission path by the wireless microphone array, where the first envelope data is envelope data of data that is collected in the first data transmission path of the wireless microphone array by a microphone, but does not receive sampled data transmitted in the first data transmission path by the wireless microphone array. Continuing the transmission of the first envelope data after the first data transmission path is deleted enables the host to learn a change in energy of the data collected in the first data transmission path by the wireless microphone array. The host subsequently controls the wireless microphone array to add the first data transmission path if the energy is relatively great.

In addition, it should be noted that, in another specific embodiment, before performing the foregoing step 101, the host may further detect an activation status of each wireless microphone array, and perform other steps such as the foregoing steps 101 to 104 for a wireless microphone array in an active state. Because the wireless microphone array sends envelope data of collected data to the host, the host can determine, according to the envelope data sent by the wireless microphone array, wireless microphone arrays that have been activated and wireless microphone arrays that have not been activated.

An inactive state refers to that a wireless microphone array joins in a network for communicating with a host, but does not enable functions of collecting data and transmitting the collected data. The active state refers to that a wireless microphone array joins in a network for communicating with a host, and enables functions of collecting data and transmitting the collected data.

Figure 4:
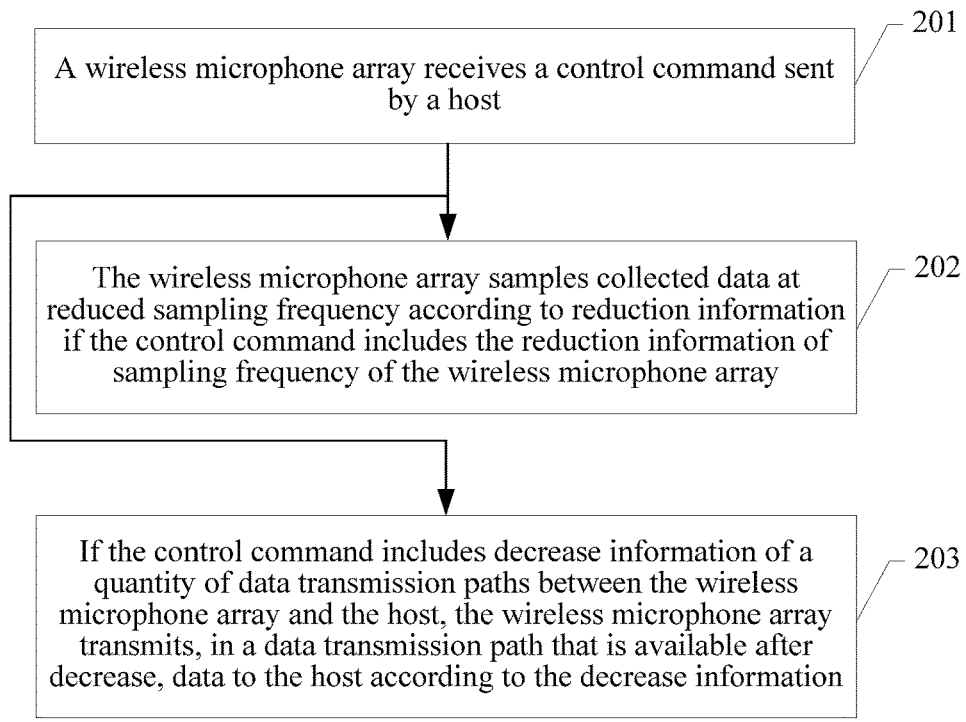
FIG. 4 is a flowchart of another data transmission method according to an embodiment of the present disclosure.

An embodiment of the present disclosure further provides another data transmission method, which is mainly applicable to a communications system that includes a host and multiple wireless microphone arrays. For the communications system, refer to the descriptions in the foregoing embodiment. The method of this embodiment is a data transmission method executed by a wireless microphone array. FIG. 4 is a flowchart of the method. The method includes the following steps.

Step 201: A wireless microphone array receives a control command sent by a host, where the control command is sent by the host according to parameter information of wireless communication channels between the wireless microphone array and the host after the host acquires the parameter information. For a specific method used by the host to send a control command in a data transmission process, refer to the descriptions in the foregoing method embodiment, and details are not described herein again.

Step 202: The wireless microphone array samples collected data at reduced sampling frequency according to reduction information if the control command includes the reduction information of sampling frequency of the wireless microphone array. Herein, the reduction information of the sampling frequency may be information such as the reduced sampling frequency, or a reduced amount of the sampling frequency, and the wireless microphone array obtains the reduced sampling frequency according to the reduction information, and performs sampling.

It should be noted that, after the wireless microphone array reduces sampling frequency and samples the collected data, if the wireless microphone array further needs to perform filtering processing on sampled data, the filtering processing step may be performed on the side of the host in order to reduce an amount of computation of the wireless microphone array. That is, after receiving data sent by the wireless microphone array, the host first performs filtering processing, and then performs other processing.

Step 203: If the control command includes decrease information of a quantity of data transmission paths between the wireless microphone array and the host, the wireless microphone array transmits, in a data transmission path that is available after decrease, data to the host according to the decrease information. The decrease information of the quantity of data transmission paths that is included in the control command may be information such as a quantity of data transmission paths that are available after the decrease, or an amount of decrease in the quantity of data transmission paths, and may further include information such as that data is not transmitted in data transmission paths between which microphones in which wireless microphone arrays and the host. In this case, the wireless microphone array may determine, according to the decrease information, that data is transmitted in which data transmission paths of the wireless microphone array, and data is not transmitted in which data transmission paths, or further, the wireless microphone array transmits data collected by which microphones to the host, and does not transmit data collected by which microphones to the host. Then, the wireless microphone array performs data transmission in a data transmission path in which data needs to be transmitted. That data is not transmitted in a data transmission path refers to that the wireless microphone array does not transmit, in the data transmission path, data sampled from the collected data.

Further, the wireless microphone array samples the collected data at increased sampling frequency according to increase information of the sampling frequency if the control command received in the foregoing step 201 includes the increase information of the sampling frequency of the wireless microphone array, and the wireless microphone array transmits, in a data transmission path that is available after the increase, data to the host according to the increase information of the quantity of data transmission paths if the control command includes the increase information of the quantity of data transmission paths between the wireless microphone array and the host.

It can be seen that, in the data transmission method of this embodiment, a host sends a control command to a wireless microphone array, to require the wireless microphone array to reduce sampling frequency or decrease a quantity of data transmission paths between the wireless microphone array and the host such that bandwidth occupied when the wireless microphone array transmits data is reduced. In this way, the host can dynamically adjust a data transmission parameter of the wireless microphone array according to an actual status of communication between the wireless microphone array and the host, which satisfies a demand of the wireless microphone array that communicates with the host as much as possible.

It should be noted that, the foregoing steps 201 to 203 are a method used by a host to control data transmission of a wireless microphone array in a process of data transmission between the wireless microphone array and the host. To enable the host to better obtain an actual status of the wireless microphone array and control data transmitted by the wireless microphone array, in a specific embodiment, the data transmitted between the wireless microphone array and the host not only needs to include data sampled from collected data by the wireless microphone array, but also needs to include envelope data of the data collected by the wireless microphone array. Further, before performing the foregoing step 201, the wireless microphone array transmits, in at least one data transmission path, data to the host, where the data transmitted in the data transmission path includes the data sampled from the collected data by the wireless microphone array, and the envelope data of the data collected by the wireless microphone array.

If in the foregoing step 203, the decrease information in the control command received by the wireless microphone array includes indication information, where the indication information is used to instruct to delete a first data transmission path of the wireless microphone array, the wireless microphone array not only needs to transmit, in a data transmission path that is available after decrease, data to the host, but also needs to transmit, in the first data transmission path, first envelope data to the host, where the first envelope data is envelope data of data that is collected in the first data transmission path of the wireless microphone array by a microphone.

Further, if a data transmission path is switched from transmitting data to not transmitting data (that is, the data transmission path is deleted), in order to ensure smooth switching, the wireless microphone array may transmit, in the data transmission path, at least one packet of sampled data, and then stop transmitting the sampled data. Further, before transmitting, in the first data transmission path, only the first envelope data to the host, the wireless microphone array needs to transmit, in the first data transmission path, at least one packet of data sampled from the collected data, and the first envelope data to the host, and then stop transmitting, in the first data transmission path, the data sampled from the collected data.

Figure 5:
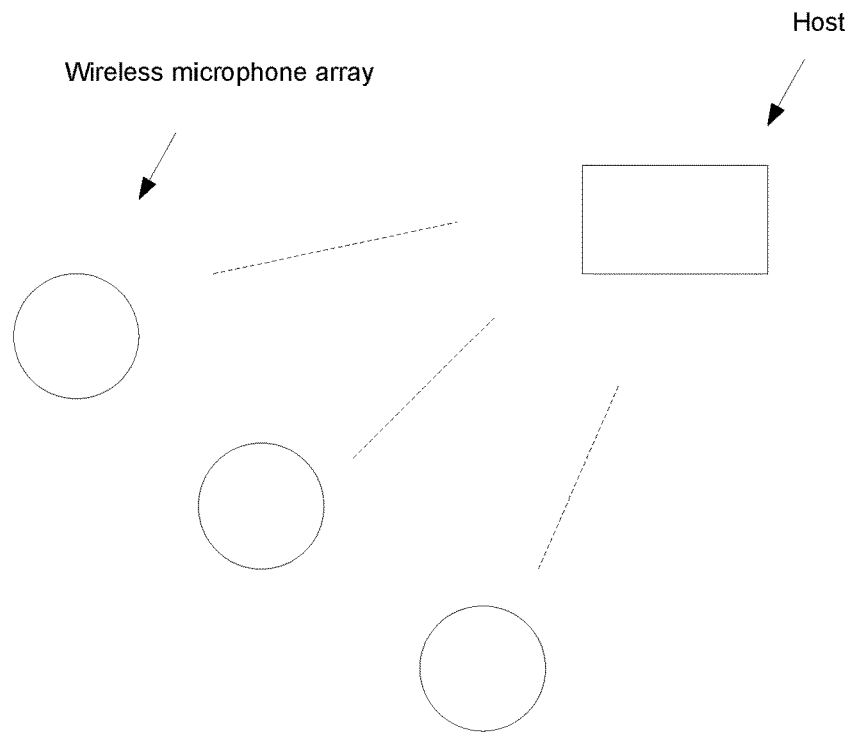
FIG. 5 is a schematic structural diagram of a data transmission system according to an application embodiment of the present disclosure.

The following describes the data transmission method of the present disclosure using a specific application embodiment. As shown in FIG. 5, in this embodiment, a host and three wireless microphone arrays are provided, where three microphones are set in each wireless microphone array to collect voice data, and each microphone is responsible for collecting voice data within a 120-degree range.

Before the wireless microphone array communicates with the host, a wireless connection is first established. In this embodiment, WiFi wireless connection is mainly used. The host assigns three identification (ID) numbers to each wireless microphone array, for example, assigns 1 to 3 to the first wireless microphone array, assigns 4 to 6 to the second wireless microphone array, and so on. In this way, the host can know the ID number of each wireless microphone array. After modulus sampling is performed on data collected by a microphone of each wireless microphone array, the data is directly sent by the wireless microphone array to the host, where the data sent by each wireless microphone array to the host may include envelope data, a microphone ID, sampling frequency, collected data, and the like. The host receives the data sent by the wireless microphone array, performs audio mixing and switching and encoding, encodes the data, and sends the encoded data to a remote end.

In a process in which the host communicates with the wireless microphone arrays, the host may periodically or randomly acquire overall parameter information of wireless communication channels between the wireless microphone arrays and the host, including information such as a signal-to-noise ratio and bandwidth, and may dynamically adjust a parameter for communication between the wireless microphone arrays and the host according to the acquired parameter information in the following manners.

(1) The host first dynamically reduces the sampling frequency of the wireless microphone array, where the host may set multiple bandwidth thresholds and multiple signal-to-noise ratio thresholds.

The host determines to reduce the sampling frequency of the wireless microphone array from 48 kHz to 32 kHz when the signal-to-noise ratio acquired by the host is less than 17 decibel (dB), or the acquired bandwidth is less than 8 MHz. The host determines to reduce the sampling frequency of the wireless microphone array from 32 kHz to 16 kHz when the signal-to-noise ratio acquired by the host is less than 15 dB, or the acquired bandwidth is less than 5 MHz.

The host may determine to increase the sampling frequency of the wireless microphone array from 16 kHz to 32 kHz when the signal-to-noise ratio acquired by the host is greater than or equal to 15 dB and is less than 17 dB, or the acquired bandwidth is greater than or equal to 10 MHz and is less than 16 MHz. The host may determine to increase the sampling frequency of the wireless microphone array from 32 kHz to 48 kHz when the signal-to-noise ratio acquired by the host is greater than or equal to 17 dB, or the acquired bandwidth is greater than or equal to 16 MHz.

The host sends a control command to the wireless microphone array after determining reduced or increased sampling frequency of the wireless microphone array. The wireless microphone array samples, at the reduced or increased sampling frequency in the control command, data collected by a microphone, and sends sampled data to the host after receiving the control command from the host.

To lower a requirement on an amount of computation of the wireless microphone array, the wireless microphone array only samples the data collected by the microphone, and filtering processing on the sampled data is performed on the side of the host.

Further, if the host reduces the sampling frequency of the wireless microphone array to minimum sampling frequency, that is, 16 kHz, and the bandwidth and the signal-to-noise ratio of the wireless communication channels between the wireless microphone array and the host continue to reduce, a quantity of data transmission paths needs to be decreased, that is, the wireless microphone array does not transmit data collected by some microphones.

The host determines to decrease a quantity of data transmission paths between one wireless microphone array and the host from three to two when the signal-to-noise ratio acquired by the host is less than 12 dB, or the acquired bandwidth is less than 3 MHz. The host determines to decrease a quantity of data transmission paths between one wireless microphone array and the host from two to one when the signal-to-noise ratio acquired by the host is less than 10 dB, or the acquired bandwidth is less than 1 MHz.

The host determines to increase a quantity of data transmission paths between one wireless microphone array and the host from one to two when the signal-to-noise ratio acquired by the host is greater than or equal to 10 dB and is less than 12 dB, or the acquired bandwidth is greater than or equal to 2 MHz and is less than 4 MHz. The host determines to increase a quantity of data transmission paths between one wireless microphone array and the host from two to three when the signal-to-noise ratio acquired by the host is greater than or equal to 12 dB, or the acquired bandwidth is greater than or equal to 4 MHz.

(2) The host first dynamically decreases a quantity of data transmission paths, to ensure sound quality of a microphone of the wireless microphone array, where the host may set multiple bandwidth thresholds and multiple signal-to-noise ratio thresholds.

The host determines to decrease a quantity of data transmission paths between one wireless microphone array and the host from three to two when the signal-to-noise ratio acquired by the host is less than 17 dB, or the acquired bandwidth is less than 8 MHz. The host determines to decrease a quantity of data transmission paths between one wireless microphone array and the host from two to one when the signal-to-noise ratio acquired by the host is less than 15 dB, or the acquired bandwidth is less than 5 MHz.

The host determines to continue to increase a quantity of data transmission paths between one wireless microphone array and the host from one to two when the signal-to-noise ratio acquired by the host is greater than or equal to 15 dB and is less than 17 dB, or the acquired bandwidth is greater than or equal to 10 MHz and is less than 16 MHz. The host determines to continue to increase a quantity of data transmission paths between one wireless microphone array and the host from two to three when the signal-to-noise ratio acquired by the host is greater than or equal to 17 dB, or the acquired bandwidth is greater than or equal to 16 MHz.

In the system in this embodiment of the present disclosure, there are three wireless microphone arrays. Therefore, at least three data transmission paths are required between the wireless microphone array and the host. The host needs to reduce the sampling frequency of the wireless microphone array when there is only one data transmission path between each wireless microphone array and the host, and current remaining bandwidth is not sufficient for transmitting data collected by one microphone.

The host determines to reduce the sampling frequency of the wireless microphone array from 48 kHz to 32 kHz when the signal-to-noise ratio acquired by the host is less than 12 dB, or the acquired bandwidth is less than 3 MHz. The host determines to reduce the sampling frequency of the wireless microphone array from 32 kHz to 16 kHz when the signal-to-noise ratio acquired by the host is less than 10 dB, or the acquired bandwidth is less than 1 MHz.

The host determines to increase the sampling frequency of the wireless microphone array from 32 kHz to 48 kHz when the signal-to-noise ratio acquired by the host is greater than or equal to 10 db and is less than 12 dB, or the acquired bandwidth is greater than or equal to 2 MHz and is less than 4 MHz. The host determines to increase the sampling frequency of the wireless microphone array from 32 kHz to 48 kHz when the signal-to-noise ratio acquired by the host is greater than or equal to 12 dB, or the acquired bandwidth is greater than or equal to 4 MHz.

Figure 6:
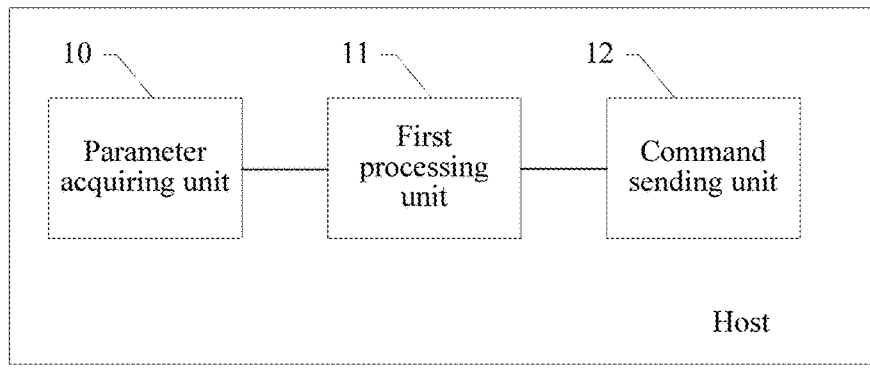
FIG. 6 is a schematic structural diagram of a host according to an embodiment of the present disclosure.

An embodiment of the present disclosure further provides a host, that is, a data transmission apparatus. FIG. 6 is a schematic structural diagram of the host. The host includes a parameter acquiring unit 10 configured to acquire parameter information of a wireless communication channels between a wireless microphone array and the host, where the parameter information includes a signal-to-noise ratio and/or bandwidth, a first processing unit 11 configured to determine reduction information of sampling frequency of the wireless microphone array, or determine decrease information of a quantity of data transmission paths between the wireless microphone array and the host if the parameter information acquired by the parameter acquiring unit 10 satisfies a first preset condition, where the first preset condition includes that the signal-to-noise ratio of the wireless communication channels is less than a first signal-to-noise ratio threshold, or the bandwidth of the wireless communication channels is less than a first bandwidth threshold, and a command sending unit 12 configured to send a control command to the wireless microphone array if the first processing unit 11 determines the reduction information of the sampling frequency, where the control command includes the reduction information of the sampling frequency, or send a control command to the wireless microphone array if the first processing unit 11 determines the decrease information of the quantity of data transmission paths, where the control command includes the decrease information of the quantity of data transmission paths.

In the host of this embodiment, the parameter acquiring unit 10 acquires parameter information of wireless communication channels between a wireless microphone array and the host. The first processing unit 11 and the command sending unit 12 are used to reduce sampling frequency of the wireless microphone array or decrease a quantity of data transmission paths between the wireless microphone array and the host if the acquired parameter information satisfies a first preset condition such that bandwidth occupied when the wireless microphone array transmits data is reduced. In this way, the host can dynamically adjust a data transmission parameter of the wireless microphone array according to an actual status of communication between the wireless microphone array and the host, which satisfies a demand of the wireless microphone array that communicates with the host as much as possible.

In a specific embodiment, the first processing unit 11 in the host is further configured to determine the reduction information of the sampling frequency of the wireless microphone array if the parameter information satisfies the first preset condition, and the first processing unit 11 is further configured to determine the decrease information of the quantity of data transmission paths between the wireless microphone array and the host if reduced sampling frequency is less than or equal to preset minimum frequency. The control command sent by the command sending unit 12 to the wireless microphone array includes the reduction information of the sampling frequency, and further includes the decrease information of the quantity of data transmission paths.

It should be noted that, the first processing unit 11 may directly determine the decrease information of the quantity of data transmission paths when the reduced sampling frequency is less than or equal to the preset minimum frequency, or when the parameter acquiring unit 10 in the host acquires parameter information of wireless communication channels between the wireless microphone array and the host next time, the first processing unit 11 determines the decrease information of the quantity of data transmission paths only if the parameter information acquired next time satisfies a third preset condition. The third preset condition further includes the signal-to-noise ratio of the wireless communication channels is less than a third signal-to-noise ratio threshold, or the bandwidth of the wireless communication channels is less than a third bandwidth threshold, where the third signal-to-noise ratio threshold is less than the first signal-to-noise ratio threshold, and the third bandwidth threshold is less than the first bandwidth threshold.

Figure 7:
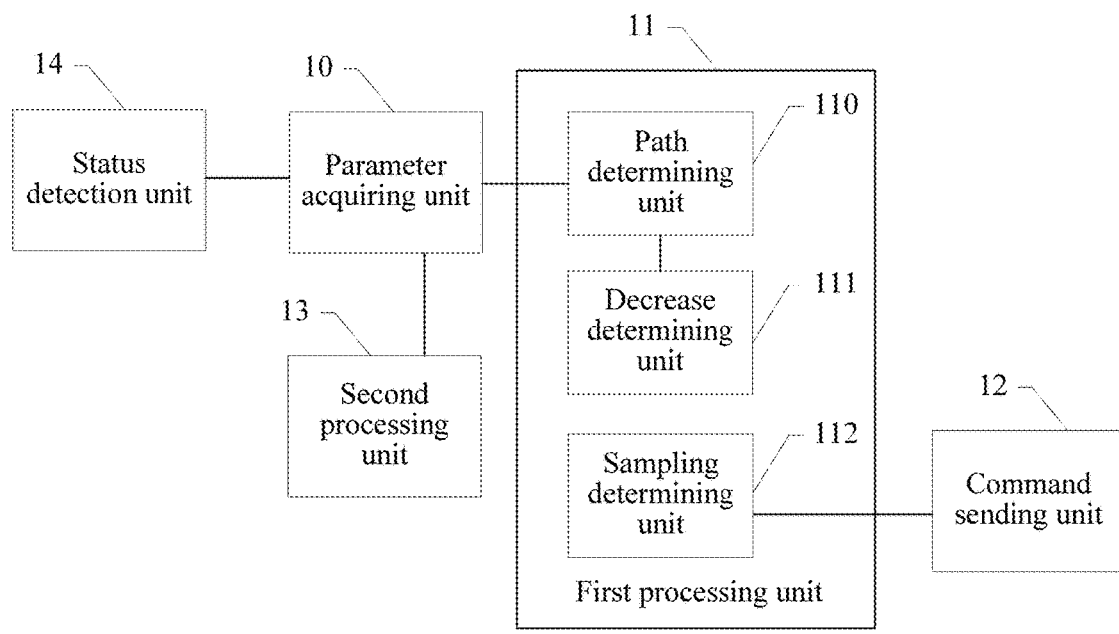
FIG. 7 is a schematic structural diagram of another host according to an embodiment of the present disclosure.

Referring to FIG. 7, in another specific embodiment, in addition to the structure shown in FIG. 6, the host may further include a data receiving unit (not shown), a second processing unit 13, and a status detection unit 14, where the first processing unit 11 may be implemented using a path determining unit 110, a decrease determining unit 111, and a sampling determining unit 112, and the second processing unit 13 is configured to determine increase information of the sampling frequency of the wireless microphone array, or determine increase information of the quantity of data transmission paths between the wireless microphone array and the host if the parameter information acquired by the parameter acquiring unit 10 satisfies a second preset condition, where the command sending unit 12 is further configured to send a control command to the wireless microphone array if the second processing unit 13 determines the increase information of the sampling frequency of the wireless microphone array, where the control command includes the increase information of the sampling frequency, or send a control command to the wireless microphone array if the second processing unit 13 determines the increase information of the quantity of data transmission paths between the wireless microphone array and the host, where the control command includes the increase information of the quantity of data transmission paths.

It should be noted that, the foregoing second preset condition further includes that the signal-to-noise ratio of the wireless communication channels is greater than a second signal-to-noise ratio threshold, or the bandwidth of the wireless communication channel is greater than a second bandwidth threshold, where the second signal-to-noise ratio threshold is greater than or equal to the first signal-to-noise ratio threshold, and the second bandwidth threshold is greater than or equal to the first bandwidth threshold.

The path determining unit 110 is configured to determine, according to a preset correspondence between parameter information and a quantity of data transmission paths, a quantity of data transmission paths that corresponds to the parameter information acquired by the parameter acquiring unit 10.

The decrease determining unit 111 is configured to set the quantity of the wireless microphone arrays as a quantity of data transmission paths that are available between the wireless microphone arrays and the host after decrease if the quantity of data transmission paths determined by the path determining unit 110 is less than a quantity of the wireless microphone arrays.

The sampling determining unit 112 is configured to determine reduction information of the sampling frequency of the wireless microphone array in a data transmission path that is available after decrease.

The foregoing command sending unit 12 is configured to send a control command to the wireless microphone array according to the information separately determined by the decrease determining unit 111 and the sampling determining unit 112, where the control command includes the decrease information of the quantity of data transmission paths, and further includes the reduction information of the sampling frequency.

The status detection unit 14 is configured to detect an activation status of the wireless microphone array, and instruct the parameter acquiring unit 10 to perform, for a wireless microphone array in an active state, the step of acquiring the parameter information.

The data receiving unit is configured to receive data that is transmitted in at least one data transmission path by the wireless microphone array, where the data that is transmitted in the data transmission path includes data sampled from collected data by the wireless microphone array, and envelope data of the data collected by the wireless microphone array, and if the decrease information in the control command sent by the command sending unit 12 to the wireless microphone array includes indication information, where the indication information is used to instruct to delete a first data transmission path of the wireless microphone array, the data receiving unit is configured to receive first envelope data that is transmitted in the first data transmission path by the wireless microphone array, where the first envelope data is envelope data of data that is collected in the first data transmission path of the wireless microphone array by a microphone. In this way, subsequently the first processing unit 11 can learn, according to the first envelope data, a change in energy of the data collected in the first data transmission path by the wireless microphone array. If the energy is relatively great, the first processing unit 11 and the command sending unit 12 subsequently control the wireless microphone array to add the first data transmission path.

Figure 8:
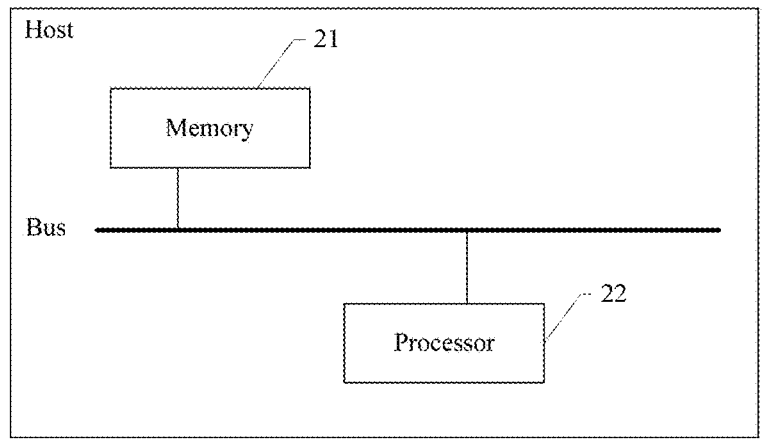
FIG. 8 is a schematic structural diagram of a host according to an embodiment of the present disclosure.

An embodiment of the present disclosure further provides another host. FIG. 8 is a schematic structural diagram of the host. The host includes a memory 21 and a processor 22 that are connected to a bus, where the memory 21 is configured to store data, and may further store information such as a necessary file for the processor 22 to process data, for example, information such as a program for the processor 22 to execute the foregoing data transmission method executed by a host, and the processor 22 is configured to acquire parameter information of wireless communication channels between a wireless microphone array and the host, where the parameter information includes a signal-to-noise ratio and/ or bandwidth, determine reduction information of sampling frequency of the wireless microphone array, and send a control command to the wireless microphone array if the acquired parameter information satisfies a first preset condition, where the control command includes the reduction information of the sampling frequency, or determine decrease information of a quantity of data transmission paths between the wireless microphone array and the host, and send a control command to the wireless microphone array, where the control command includes the decrease information of the quantity of data transmission paths such that bandwidth occupied when the wireless microphone array transmits data is reduced. In this way, the host can dynamically adjust a data transmission parameter of the wireless microphone array according to an actual status of communication between the wireless microphone array and the host, which satisfies a demand of the wireless microphone array that communicates with the host as much as possible.

In a specific embodiment, when the parameter information satisfies the first preset condition, the processor 22 determines the reduction information of the sampling frequency of the wireless microphone array, and the processor 22 is further configured to determine the decrease information of the quantity of data transmission paths between the wireless microphone array and the host, and send a control command to the wireless microphone array if reduced sampling frequency is less than or equal to preset minimum frequency, where the control command not only includes the reduction information of the sampling frequency, but also needs to include the decrease information of the quantity of data transmission paths.

It should be noted that, in this case, the processor 22 directly decreases the quantity of data transmission paths when the reduced sampling frequency is less than or equal to the preset minimum frequency. In another specific embodiment, when acquiring parameter information of a wireless communication channels between the wireless microphone array and the host next time, the processor 22 may decrease the quantity of data transmission paths only if the parameter information acquired next time satisfies a third preset condition. The third preset condition further includes that the signal-to-noise ratio of the wireless communication channels is less than a third signal-to-noise ratio threshold, or the bandwidth of the wireless communication channels is less than a third bandwidth threshold, where the third signal-to-noise ratio threshold is less than the first signal-to-noise ratio threshold, and the third bandwidth threshold is less than the first bandwidth threshold.

In another specific embodiment, the processor 22 is further configured to determine increase information of the sampling frequency of the wireless microphone array, and send a control command to the wireless microphone array if the acquired parameter information satisfies a second preset condition, where the control command includes the increase information of the sampling frequency, or determine increase information of the quantity of data transmission paths between the wireless microphone array and the host, and send a control command to the wireless microphone array, where the control command includes the increase information of the quantity of data transmission paths.

It should be noted that, the foregoing second preset condition further includes the signal-to-noise ratio of the wireless communication channels is greater than a second signal-to-noise ratio threshold, or the bandwidth of the wireless communication channels is greater than a second bandwidth threshold, where the second signal-to-noise ratio threshold is greater than or equal to the first signal-to-noise ratio threshold, and the second bandwidth threshold is greater than or equal to the first bandwidth threshold.

In another specific embodiment, when determining to decrease the quantity of data transmission paths between the wireless microphone array and the host, the processor 22 may be further configured to determine, according to a preset correspondence between parameter information and a quantity of data transmission paths, a quantity of data transmission paths that corresponds to the acquired parameter information, and set the quantity of the wireless microphone arrays as a quantity of data transmission paths that are available between the wireless microphone arrays and the host after the decease if the determined quantity of data transmission paths is less than a quantity of the wireless microphone arrays. In addition, in this case, the processor 22 is further configured to determine, on the basis of decreasing the quantity of data transmission paths, reduction information of sampling frequency of a wireless microphone array in a data transmission path that is available after the decrease.

The control command sent by the processor 22 to the wireless microphone array includes the decrease information of the quantity of data transmission paths, and further includes the reduction information of the sampling frequency.

It may be understood that, the processor 22 is further configured to detect an activation status of the wireless microphone array, and perform, for a wireless microphone array in an active state, the step of acquiring the parameter information.

In addition, it should be noted that, the processor 22 is further configured to receive data that is transmitted in at least one data transmission path by the wireless microphone array, where the data that is transmitted in the data transmission path includes data sampled from collected data by the wireless microphone array, and envelope data of the data collected by the wireless microphone array. Then, the processor 22 obtains, through comparison, a maximum volume to the power of N according to envelope data transmitted in each data transmission path, performs audio mixing and encoding, encodes the data, and sends the encoded data to a remote end. If the decrease information in the control command sent by the processor 22 to the wireless microphone array includes indication information, where the indication information is used to instruct to delete a first data transmission path of the wireless microphone array, the processor 22 is further configured to receive first envelope data that is transmitted in the first data transmission path by the wireless microphone array, where the first envelope data is envelope data of data that is collected in the first data transmission path of the wireless microphone array by a microphone. In this way, subsequently the processor 22 can learn, according to the first envelope data, a change in energy of the data collected in the first data transmission path by the wireless microphone array. If the energy is relatively great, the processor 22 subsequently controls the wireless microphone array to add the first data transmission path.

Figure 9:
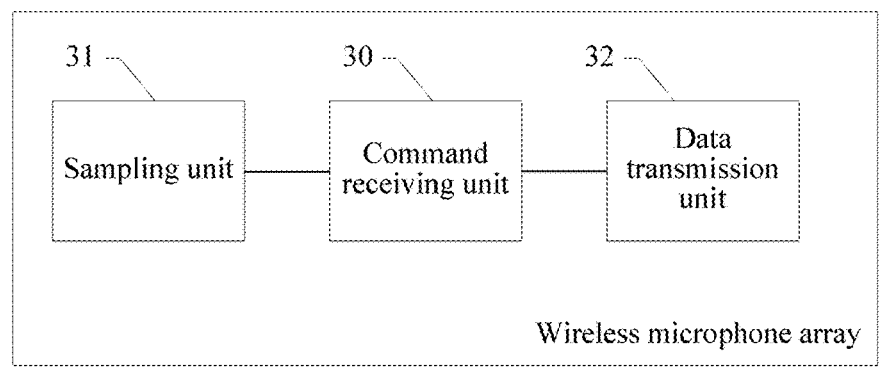
FIG. 9 is a schematic structural diagram of a wireless microphone array according to an embodiment of the present disclosure.

An embodiment of the present disclosure further provides a wireless microphone array. FIG. 9 is a schematic structural diagram of the wireless microphone array. The wireless microphone array includes a command receiving unit 30 configured to receive a control command sent by a host, a sampling unit 31 configured to sample, by the wireless microphone array, collected data at reduced sampling frequency according to the reduction information if the control command received by the command receiving unit 30 includes reduction information of sampling frequency of the wireless microphone array, where the reduction information of the sampling frequency may be information such as the reduced sampling frequency, or a reduced amount of the sampling frequency, and the sampling unit 31 obtains the reduced sampling frequency according to the reduction information, and performs sampling, and a data transmission unit 32 configured to transmit, by the wireless microphone array, in a data transmission path that is available after decrease, data to the host according to the decrease information if the control command received by the command receiving unit 30 includes decrease information of a quantity of data transmission paths between the wireless microphone array and the host.

The sampling unit 31 is further configured to sample the collected data at increased sampling frequency according to the increase information of the sampling frequency if the control command received by the command receiving unit 30 includes increase information of the sampling frequency of the wireless microphone array, and the data transmission unit 32 is further configured to transmit, in a data transmission path that is available after increase, data to the host according to the increase information of the quantity of data transmission paths if the control command received by the command receiving unit 30 includes increase information of the quantity of data transmission paths between the wireless microphone array and the host.

In this embodiment, a host sends a control command to the wireless microphone array, to require the wireless microphone array to reduce sampling frequency or decrease a quantity of data transmission paths between the wireless microphone array and the host such that bandwidth occupied when the wireless microphone array transmits data is reduced. In this way, the host can dynamically adjust a data transmission parameter of the wireless microphone array according to an actual status of communication between the wireless microphone array and the host, which satisfies a demand of the wireless microphone array that communicates with the host as much as possible.

It should be noted that, in a specific embodiment, the data transmitted between the data transmission unit 32 and the host not only needs to include data sampled from the collected data by the wireless microphone array, but also needs to include envelope data of the data collected by the wireless microphone array. The data transmission unit 32 is further configured to transmit, in at least one data transmission path, data to the host, where the data that is transmitted in the data transmission path includes data sampled from the collected data by the wireless microphone array, and envelope data of the data collected by the wireless microphone array. If the decrease information in the control command received by the command receiving unit 30 includes indication information, where the indication information is used to instruct to delete a first data transmission path of the wireless microphone array, the data transmission unit 32 is further configured to transmit, in the first data transmission path, first envelope data to the host, where the first envelope data is envelope data of data that is collected in the first data transmission path of the wireless microphone array by a microphone.

Further, if a data transmission path is switched from transmitting data to not transmitting data (that is, the data transmission path is deleted), in order to ensure smooth switching, the wireless microphone array may transmit, in the data transmission path, at least one packet of sampled data, and then stop transmitting the sampled data. Further, before transmitting, in the first data transmission path, only the first envelope data to the host, the data transmission unit 32 needs to transmit, in the first data transmission path, at least one packet of data sampled from the collected data, and the first envelope data to the host, and then stop transmitting, in the first data transmission path, the data sampled from the collected data.

Figure 10:
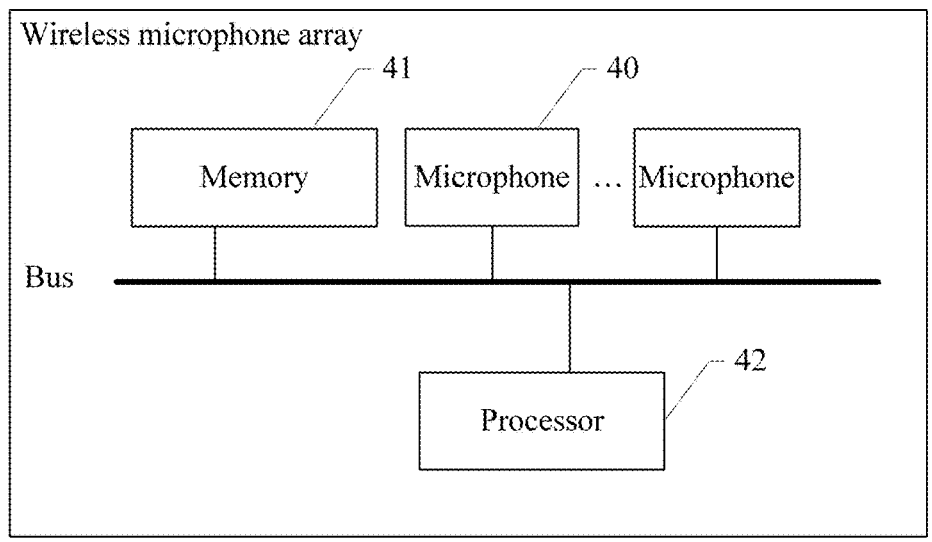
FIG. 10 is a schematic structural diagram of another wireless microphone array according to an embodiment of the present disclosure.

An embodiment of the present disclosure further provides another wireless microphone array. FIG. 10 is a schematic structural diagram of the wireless microphone array. The wireless microphone array includes at least one microphone 40, a memory 41, and a processor 42 that are connected to a bus, where the microphone 40 is configured to collect data, the memory 41 is configured to store data, and may further store information such as a necessary file for the processor 42 to process data, for example, information such as a program for the processor 42 to execute the foregoing data transmission method executed by a wireless microphone array, and the processor 42 is configured to receive a control command sent by a host. The wireless microphone array samples collected data at reduced sampling frequency according to the reduction information if the control command includes reduction information of sampling frequency of the wireless microphone array, where the reduction information of the sampling frequency may be information such as reduced sampling frequency, or a reduced amount of sampling frequency, and the processor 42 obtains the reduced sampling frequency according to the reduction information, and performs sampling, and the wireless microphone array transmits, in a data transmission path that is available after decrease, data to the host according to the decrease information if the control command includes decrease information of a quantity of data transmission paths between the wireless microphone array and the host.

The processor 42 is further configured to sample the collected data at increased sampling frequency according to the increase information of the sampling frequency if the control command includes increase information of the sampling frequency of the wireless microphone array, and transmit, in a data transmission path that is available after increase, data to the host according to the increase information of the quantity of data transmission paths if the control command includes increase information of the quantity of data transmission paths between the wireless microphone array and the host.

In this way, the host can dynamically adjust a data transmission parameter of the wireless microphone array according to an actual status of communication between the wireless microphone array and the host, which satisfies a demand of the wireless microphone array that communicates with the host as much as possible.

It should be noted that, in a specific embodiment, the data transmitted between the processor 42 and the host not only needs to include data sampled from the collected data by the wireless microphone array, but also needs to include envelope data of the data collected by the wireless microphone array. Further, the processor 42 is further configured to transmit, in at least one data transmission path, data to the host, where the data that is transmitted in the data transmission path includes data sampled from the collected data by the wireless microphone array, and envelope data of the data collected by the wireless microphone array. If the decrease information in the control command includes indication information, where the indication information is used to instruct to delete a first data transmission path of the wireless microphone array, the processor 42 is further configured to transmit, in the first data transmission path, first envelope data to the host, where the first envelope data is envelope data of data that is collected in the first data transmission path of the wireless microphone array by the microphone 40.

Further, if a data transmission path is switched from transmitting data to not transmitting data (that is, the data transmission path is deleted), in order to ensure smooth switching, the wireless microphone array may transmit, in the data transmission path, at least one packet of sampled data, and then stop transmitting the sampled data. Further, before transmitting, in the first data transmission path, only the first envelope data to the host, the processor 42 needs to transmit, in the first data transmission path, at least one packet of data sampled from the collected data, and the first envelope data to the host, and then stop transmitting, in the first data transmission path, the data sampled from the collected data.

An embodiment of the present disclosure further provides a data transmission system, including a host and multiple wireless microphone arrays. A structure of the host may be the structure of the host in the embodiment in FIG. 6, FIG. 7, or FIG. 8, and details are not described herein again. The wireless microphone array is configured to collect data, sample the collected data, send the sampled data to the host, receive a control command sent by the host, and execute the control command. A structure of the wireless microphone array may be the structure of the wireless microphone array in the embodiment in FIG. 9 or FIG. 10, and details are not described herein again.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random-access memory (RAM), a magnetic disk, or an optical disc.

The data transmission method and system and the related device that are provided in the embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A data transmission method, comprising:
    acquiring, by a processor of a host, parameter information of wireless communication channels between a wireless microphone array and the host, the parameter information comprising a quantity of data transmission paths between the wireless microphone array and the host, a signal-to-noise ratio, and a bandwidth of the wireless communication channels; and
    sending, by a transmitter coupled to the processor, a control command to the wireless microphone array in response to determining that the parameter information is less than a threshold, the control command comprising reduction information of a sampling frequency of the wireless microphone array and decrease information of the quantity of data transmission paths between the wireless microphone array.

2. The method according to claim 1, wherein the parameter information satisfies a second preset condition, the method further comprises:
    determining, by the processor, increase information of the sampling frequency of the wireless microphone array or the quantity of data transmission paths between the wireless microphone array and the host; and
    sending, by the transmitter, a control command comprising the increase information to the wireless microphone array.

3. The method according to claim 2, wherein in response to the parameter information satisfying a first preset condition, the control command is sent to the wireless microphone array, wherein the first preset condition comprises at least one of the signal-to-noise ratio of the wireless communication channels being less than a first signal-to-noise ratio threshold or the bandwidth of the wireless communication channels being less than a first bandwidth threshold, the second preset condition comprises at least one of the signal-to-noise ratio of the wireless communication channels being greater than a second signal-to-noise ratio threshold or the bandwidth of the wireless communication channels being greater than a second bandwidth threshold, the second signal-to-noise ratio threshold is greater than or equal to the first signal-to-noise ratio threshold, and the second bandwidth threshold is greater than or equal to the first bandwidth threshold.

4. The method according to claim 1, further comprising:
    determining, by the processor, the reduction information of the sampling frequency of the wireless microphone array; and
    determining, by the processor, the decrease information of the quantity of data transmission paths between the wireless microphone array and the host in response to reduced sampling frequency being less than or equal to a preset minimum frequency.

5. The method according to claim 1, wherein before acquiring the parameter information of the wireless communication channels, the method further comprises:
    detecting, by the processor, an activation status of the wireless microphone array; and
    performing, by the processor, the operations of acquiring the parameter information;
    determining the reduction information of the sampling frequency; and
    sending the control command for a wireless microphone array in an active state.

6. The method according to claim 1, wherein before acquiring the parameter information of the wireless communication channels, the method further comprises:
    detecting, by the processor, an activation status of the wireless microphone array, and;
    performing, by the processor, the operations of acquiring the parameter information;
    determining the decrease information of the quantity of data transmission paths; and
    sending the control command for a wireless microphone array in an active state.

7. The method according to claim 1, wherein before acquiring the parameter information of the wireless communication channels, the method further comprises:
    receiving, by a receiver coupled to the processor, data transmitted in at least one data transmission path by the wireless microphone array, the data transmitted in the at least one data transmission path comprising data sampled from collected data by the wireless microphone array, and envelope data of the data sampled by the wireless microphone array; and
    receiving, by the receiver from the wireless microphone array, first envelope data transmitted in a first data transmission path of the wireless microphone array in response to the decrease information in the control command sent to the wireless microphone array comprising indication information, the indication information instructing the wireless microphone array to delete the first data transmission path of the wireless microphone array, and the first envelope data being envelope data of data collected in the first data transmission path of the wireless microphone array by a microphone.

8. A data transmission method, comprising:
transmitting, by a transmitter of a wireless microphone array to a host, parameter information of wireless communication channels between the wireless microphone array and the host, the parameter information comprising a quantity of data transmission paths between the wireless microphone array and the host, a signal-to-noise ratio, and a bandwidth of the wireless communication channels;
receiving, by a receiver of the wireless microphone array, a control command from the host, the control command comprising reduction information of a sampling frequency of the wireless microphone array and decrease information of the quantity of data transmission paths between the wireless microphone array;
sampling, by the receiver of the wireless microphone array, collected data at reduced sampling frequency according to the reduction information of sampling frequency of the wireless microphone array in response to the control command comprising the reduction information; and
transmitting, by a transmitter of the wireless microphone array in a data transmission path available after decreasing the quantity of data transmission paths between the wireless microphone array and the host, data to the host according to the decrease information of the quantity of the data transmission paths between the wireless microphone array and the host in response to the control command comprising the decrease information.

9. The method according to claim 8, wherein before receiving the control command, the method further comprises:
transmitting, by the transmitter of the wireless microphone array in at least one data transmission path, the data to the host, the data transmitted in the at least one data transmission path comprising data sampled from the collected data by the wireless microphone array and envelope data of the data collected by the wireless microphone array; and
transmitting, by the transmitter of the wireless microphone array in a first data transmission path of the wireless microphone array, first envelope data to the host in response to the decrease information in the control command received by the wireless microphone array comprising indication information, the indication information instructing the wireless microphone array to delete the first data transmission path of the wireless microphone array, and the first envelope data being envelope data of data collected in the first data transmission path of the wireless microphone array by a microphone.

10. The method according to claim 9, wherein before transmitting the first envelope data to the host, the method further comprises:
transmitting, by the transmitter of the wireless microphone array in the first data transmission path, at least one packet of the data sampled from the collected data by the wireless microphone array and the first envelope data to the host; and
stopping transmitting, in the first data transmission path, the data sampled from the collected data by the wireless microphone array.

11. The method according to claim 8, wherein the method further comprises:
sampling, by a processor of the wireless microphone array, the collected data at increased sampling frequency according to increase information of the sampling frequency in response to the control command comprising the increase information of the sampling frequency of the wireless microphone array; and
transmitting, by the transmitter of the wireless microphone array in a data transmission path that is available after increase, the data to the host according to increase information of the quantity of data transmission paths in response to the control command comprising the increase information of the quantity of data transmission paths between the wireless microphone array and the host.

12. A host, comprising:
a memory; and
a processor coupled to the memory and configured to:
acquire parameter information of wireless communication channels between a wireless microphone array and the host, the parameter information comprising a quantity of data transmission paths between the wireless microphone array and the host, a signal-to-noise ratio, and a bandwidth of the wireless communication channels;
determine reduction information of a sampling frequency of the wireless microphone array in response to determining that the parameter information is less than a threshold;
determine decrease information of a quantity of data transmission paths between the wireless microphone array and the host in response to determining that the parameter information is less than a threshold; and
send a control command comprising the reduction information of a sampling frequency of the wireless microphone array and the decrease information of the quantity of data transmission paths to the wireless microphone array.

13. The host according to claim 12, wherein the processor is further configured to:
determine increase information of the sampling frequency of the wireless microphone array or the quantity of data transmission paths between the wireless microphone array and the host in response to the parameter information satisfying a second preset condition; and
send a control command comprising the increase information to the wireless microphone array.

14. The host according to claim 13, wherein in response to the parameter information satisfying a first preset condition, the control command is sent to the wireless microphone array, wherein the first preset condition comprises at least one of the signal-to-noise ratio of the wireless communication channels being less than a first signal-to-noise ratio threshold or the bandwidth of the wireless communication channels being less than a first bandwidth threshold, the second preset condition comprises at least one of the signal-to-noise ratio of the wireless communication channels being greater than a second signal-to-noise ratio threshold or the bandwidth of the wireless communication channels being greater than a second bandwidth threshold, the second signal-to-noise ratio threshold is greater than or equal to the first signal-to-noise ratio threshold, and the second bandwidth threshold is greater than or equal to the first bandwidth threshold.

15. The host according to claim 12, wherein the processor is further configured to send a control command comprising the reduction information of the sampling frequency, and the decrease information of the quantity of data transmission paths to the wireless microphone array.

16. The host according to claim 12, wherein the processor is further configured to:
   determine, according to a preset correspondence between the parameter information and the quantity of data transmission paths, a quantity of data transmission paths corresponding to the parameter information;
   set a quantity of the wireless microphone arrays as a quantity of data transmission paths that are available between the wireless microphone arrays and the host after the decrease in response to the quantity of data transmission paths being less than the quantity of the wireless microphone arrays;
   determine a reduction information of sampling frequency of a wireless microphone array in a data transmission path available after the decrease; and
   send a control command comprising the decrease information of the quantity of data transmission paths and the reduction information of the sampling frequency of the wireless microphone array in the data transmission path available after the decrease to the wireless microphone array.

17. The host according to claim 12, wherein the processor is further configured to:
   detect an activation status of the wireless microphone array; and
   perform, for a wireless microphone array in an active state, the operation of acquiring the parameter information.

18. The host according to claim 12, wherein the processor is further configured to:
   receive data transmitted in at least one data transmission path by the wireless microphone array, the data transmitted in the at least one data transmission path comprising data sampled from collected data by the wireless microphone array, and envelope data of the data collected by the wireless microphone array; and
   receive first envelope data transmitted in a first data transmission path of the wireless microphone array by the wireless microphone array in response to the decrease information sent to the wireless microphone array comprising indication information, the indication information instructing the wireless microphone array to delete the first data transmission path of the wireless microphone array, the first envelope data being envelope data of data collected in the first data transmission path of the wireless microphone array by a microphone.

19. A data transmission system, comprising:
a host, comprising:
   a memory; and
   a processor coupled to the memory and configured to:
      acquire parameter information of wireless communication channels between a wireless microphone array and the host, the parameter information comprising a quantity of data transmission paths between the wireless microphone array and the host, a signal-to-noise ratio or a bandwidth of the wireless communication channels;
      determine reduction information of sampling frequency of the wireless microphone array and decrease information of a quantity of data transmission paths between the wireless microphone array and the host in response to determining that the parameter information is less than a threshold; and
      send a control command comprising the reduction information of the sampling frequency and the decrease information of the quantity of data transmission paths to the wireless microphone array to the wireless microphone array; and
the wireless microphone array coupled to the host and configured to:
   transmit the parameter information to the host;
   receive the control command from the host;
   sample, by the wireless microphone array, collected data at a reduced sampling frequency according to the reduction information of the sampling frequency of the wireless microphone array in response to the received control command comprising the reduction information; and
   transmit, by the wireless microphone array, in a data transmission path available after decreasing the quantity of data transmission paths between the wireless microphone array and the host, data to the host according to the decrease information in response to the received control command comprising the decrease information.

* * * * *